March 8, 1927.  A. L. LAMBERT  1,620,616
METHOD OF MAKING AXLE HOUSINGS
Filed Jan. 21, 1926    2 Sheets-Sheet 1
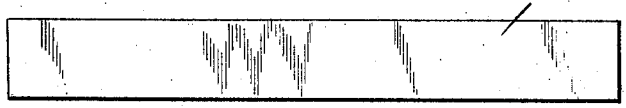
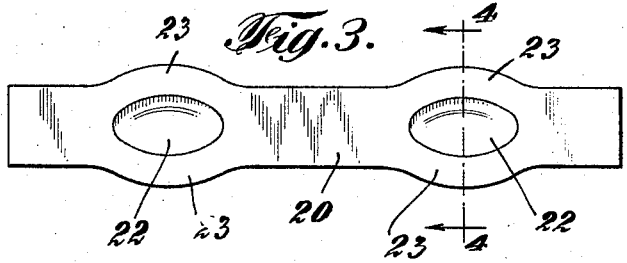
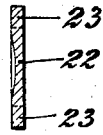
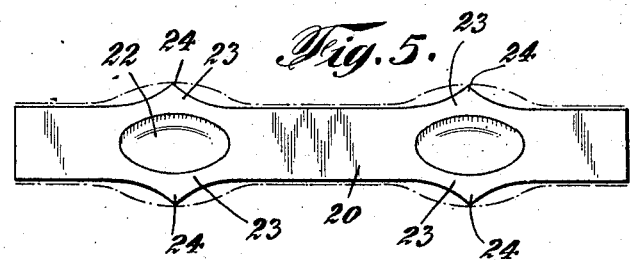
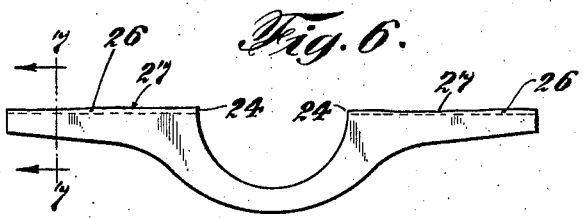
INVENTOR
Albert S. Lambert
BY
ATTORNEY March 8, 1927. 1,620,616
A. L. LAMBERT
METHOD OF MAKING AXLE HOUSINGS
Filed Jan. 21, 1926   2 Sheets-Sheet 2
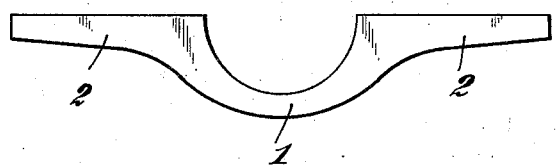
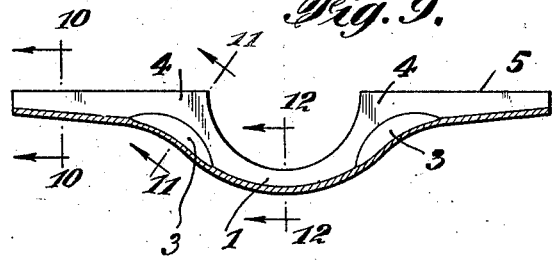 
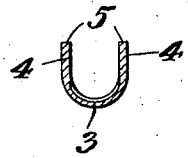 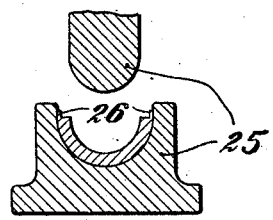 
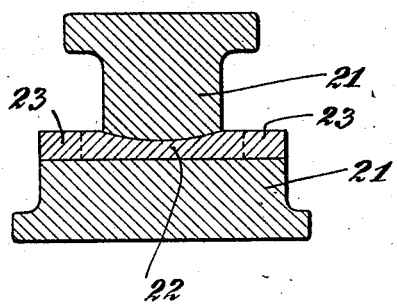 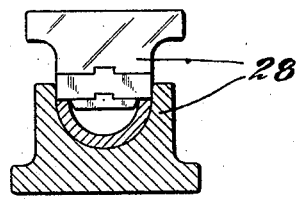
INVENTOR
Albert L. Lambert
BY
ATTORNEY Patented Mar. 8, 1927.

1,620,616

UNITED STATES PATENT OFFICE.

ALBERT L. LAMBERT, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

METHOD OF MAKING AXLE HOUSINGS.

Application filed January 21, 1926. Serial No. 82,670.

This invention relates to axle housings, and more particularly to axle housing sections comprising stamped sheet metal, and to method of making the same.

The principal object of my invention is to provide axle housing sections which are formed with integral reinforcements where increased strength is desired, and with lightened portions where less strength is required, to the end that the sections may be made quickly, inexpensively and economically, and at the same time have extreme durability and strength, combined with lightness in weight. A further object of my invention is to provide a method of making axle housing sections of the character described. Other objects of this invention will be in part obvious and in part pointed out hereinafter.

In order that a clearer understanding of my invention may be had, attention is hereby directed to the accompanying drawings, forming a part of this application and illustrating certain possible embodiments of my invention.

Referring to the drawings, Fig. 1 is a plan of a blank of sheet metal from which an axle housing section embodying my invention may be made by practicing the method of my invention; Fig. 2 is an end view of the same; Fig. 3 is a view of the blank after the same has been expanded crosswise at the portions which are to form the shoulders of the finished housing section; Fig. 4 is a sectional view thereof, and is taken on the line 4—4 of Fig. 3; Fig. 5 is a view of the expanded blank cut down to shape for bending into U-form with channel cross-section, the metal cut away being indicated by dot and dash lines; Fig. 6 is a side view of the cut-down blank bent into U-form with channel cross-section, and indicating in dotted lines the uneven fins of metal which are present along the longitudinal edges of the stamping at the end of this operation; Fig. 7 is a sectional view thereof, and is taken on the line 7—7 of Fig. 6; Fig. 8 is a view of the U-shaped, stamped, housing section with the longitudinal edges smoothed down and straightened and the fins eliminated; Fig. 9 is a longitudinal sectional view of the same; Figs. 10, 11 and 12 are each a sectional view thereof, and are taken, respectively, on the lines 10—10, 11—11 and 12—12 of Fig. 9; Fig. 13 is a diagrammatical sectional view of the original blank being operated upon by the flattening and spreading die; Fig. 14 is a diagrammatical sectional view of the axle housing section associated with the die which performs the first bending operation, the die being shown open; and Fig. 15 is a diagrammatical sectional view of the section, shaped by the first bending operation, associated with a die for smoothing and straightening the longitudinal edges and eliminating the fins, the die being shown closed. Similar reference characters refer to similar parts throughout the several views of the drawings.

Referring to the drawings, the finished axle housing section (see Figs. 8 to 12, inclusive) is of customary shape, being channel-shaped in cross-section, and longitudinally comprising a bowed central section 1 and oppositely extending arms 2. At the shoulder portions 3 of this section, the metal is thinned, but the adjacent side walls 4 are of unreduced thickness. The longitudinal edges 5 of the section are smooth and flat, which is quite important, for this facilitates the welding of two of these sections together to form the complete housing, since, if the meeting edges of the sections are rough and uneven, the weld is apt to be faulty and weak, and when the edges are smooth and even, a better and stronger weld is insured, and much time and labor is avoided in correcting a weld which would otherwise be weak and faulty.

I have provided a simple, effective and economical method of manufacturing sections of this character integrally out of flat strips of sheet metal, such as 20. The first step is to subject the blank 20 to a die couple 21, which flattens the blank at the places which are to become the shoulder portions 3 in the finished section. The die operates to flatten only the center portions 22 and to leave the edge portions 23 of the original thickness. The blank is then cut to shape, by removing some along each long edge, to form points 24 in the portions 23, which will be the meeting edges between the arms and the bowed section of the finished housing section. The blank is then stamped into U-form and transverse channel shape, by subjecting the blank to a suitable die couple 25. This operation usually results in the formation of fins 26 and unevenness, as at 27, along the longitudinal edges of the arm portions of the housing section. This blank is then subjected to another die couple 28, which presses down the fins 26 and smooths and evens the longitudinal edges of the housing section arms without distorting the shape of the section. The housing section is now complete and ready for welding to a complementary section to form a complete housing.

From the above, it will be apparent that the method is simple and ecenomical and is conducive to the making of improved axle housing sections quickly and uniformly. It will also be apparent that the axle housing section effects an economy in weight and material without strength being sacrificed where it is required. The housing section is strong and durable and tends to eliminate faulty and weak welding of two sections together into a complete housing.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. The method of making axle housing sections, which consists of widening laterally to the required width predetermined portions of a sheet metal blank which would otherwise be too narrow for the section, leaving metal of the original thickness of the blank at the side edges of the widened portions, the blank being thereby rendered thinner between said side edges, cutting the blank down to predetermined shape, and fashioning the blank to have a bowed portion with oppositely extending arms and to have transverse curvature, with said widened portions located at the juncture between the arms and the bowed portion, so that the side walls at the widened portions will have the original thickness of the blank.

2. The method of making axle housing sections, which consists of widening laterally to the required width predetermined portions of a sheet metal blank which would otherwise be too narrow for the section, leaving metal of the original thickness of the blank at the side edges of the widened portions, the blank being thereby rendered thinner between said side edges cutting the blank down to predetermined shape, fashioning the blank to have a bowed portion with oppositely extending arms and to have transverse curvature, with said widened portions located at the juncture between the arms and the bowed portion, so that the side walls at the widened portions will have the original thickness of the blank, and stamping the longitudinal edges down so as to render them smooth and even.

3. The method of making axle housing sections, which consists of widening laterally to the required width predetermined portions of a sheet metal blank which would othewise be too narrow for the section, leaving metal of the original thickness of the blank at the side edges of the widened portions, the blank being thereby rendered thinner between said side edges cutting the blank down to predetermined shape, fashioning the blank to have a bowed portion with oppositely extending arms and to have transverse curvature, with said widened portions located at the juncture between the arms and the bowed portion, so that the side walls at the widened portions will have the original thickness of the blank, and stamping the longitudinal edges down so as to render them smooth and even, while preventing distortion of the transverse curvature of the section.

This specification signed this 18 day of January, 1926.

ALBERT L. LAMBERT.